Figure 1:
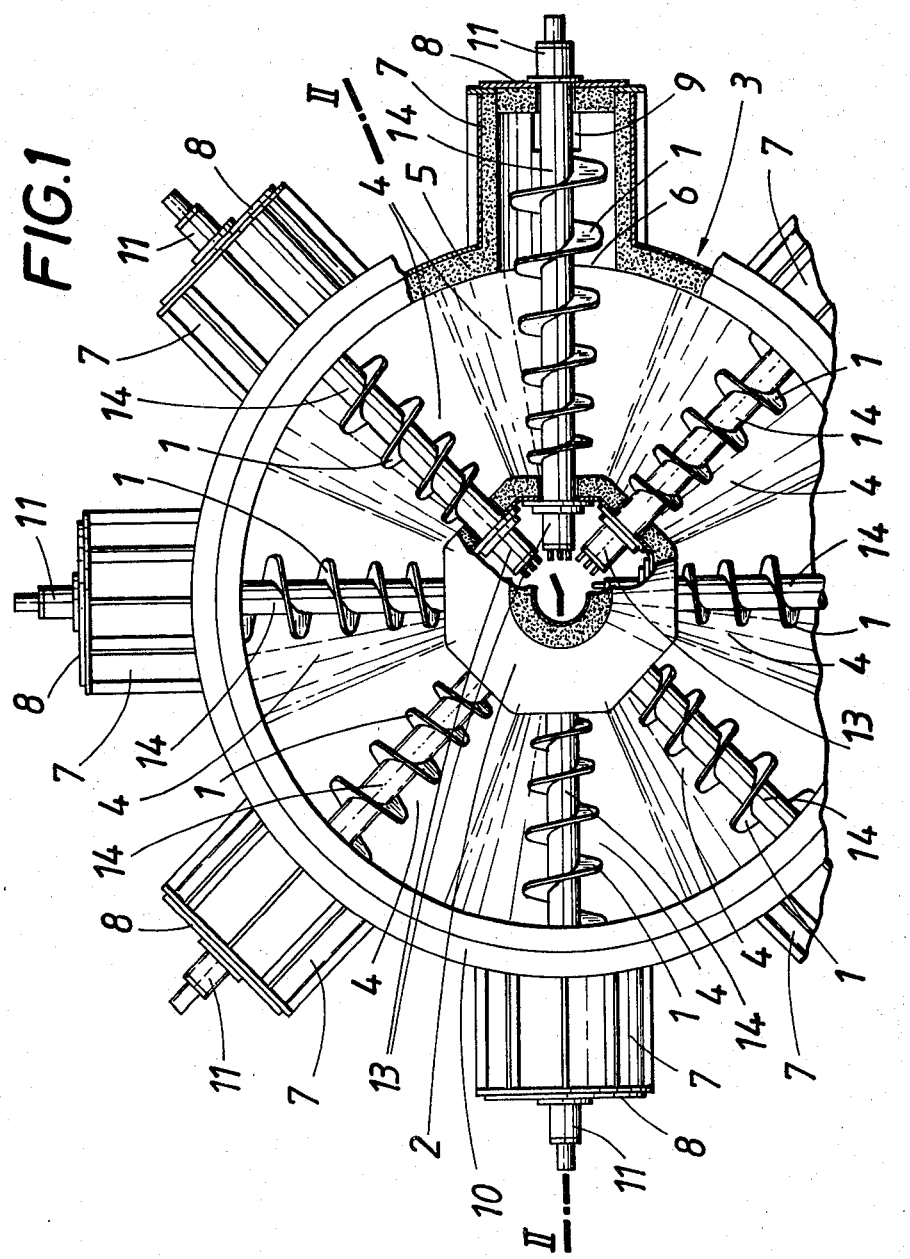

United States Patent [19]
Pirklbauer et al.

[11] 4,413,812
[45] Nov. 8, 1983

[54] APPARATUS FOR DISCHARGING HOT FLOWABLE SOLIDS, PARTICULARLY SPONGE IRON, FROM A SHAFT FURNACE

[75] Inventors: Wilfried Pirklbauer, Linz; Martin Nagl, Rutzenmoos, both of Austria

[73] Assignee: Voest-Alpine Aktiengesellschaft, Linz, Austria

[21] Appl. No.: 451,043

[22] Filed: Dec. 20, 1982

[30] Foreign Application Priority Data

Jan. 11, 1982 [AT] Austria ................................. 50/82

[51] Int. Cl.$^3$ .............................................. F27B 1/20
[52] U.S. Cl. .................................... 266/195; 266/197; 414/213; 432/98
[58] Field of Search ............... 266/195, 197; 414/213; 432/98

[56] References Cited
U.S. PATENT DOCUMENTS

3,704,011  11/1972  Hand et al. ......................... 266/195
4,005,857  2/1977  Colautti .............................. 266/195

*Primary Examiner*—M. J. Andrews
*Attorney, Agent, or Firm*—Kurt Kelman

[57] ABSTRACT

Apparatus for discharging hot flowable solids comprises conical conveyor screws, which are arranged to form a star-shaped array and contained in respective conveyor troughs and at their inner ends are rotatably mounted in a centrally disposed hollow body. In order to ensure a gas-tight seal of the furnace and to permit a simple replacement of the conveyor screws, the conveyor troughs and the centrally disposed, open-bottomed hollow body are constituted by a bottom structure, which is adapted to be flange-connected to the shell of the furnace. The largest depth of each conveyor trough is at least as large as the largest outside diameter of the associated conveyor screw. Each conveyor trough is closed at its outer end by an end wall, which carries a discharge housing, which contains the outer end of the associated conveyor screw and carries a discharge fitting.

10 Claims, 3 Drawing Figures

APPARATUS FOR DISCHARGING HOT FLOWABLE SOLIDS, PARTICULARLY SPONGE IRON, FROM A SHAFT FURNACE

This invention relates to apparatus for discharging hot flowable solids, particularly sponge iron, from a shaft furnace, which apparatus comprises a plurality of conical conveyor screws, which are arranged to form a star-shaped array and are contained in respective conveyor troughs and at their inner end are rotatably mounted in a centrally disposed hollow body.

In known discharge apparatus of that kind, disclosed in U.S. Pat. No. 3,704,011, each conveyor screw is rotatably mounted at its outer end in the shell of the furnace and at its inner end in a central tube, which extends through the furnace. A bottom structure composed of discrete sectors is disposed under the conveyor screws between the central tube and the shell of the furnace and extends into the triangular spaces between the closely spaced apart conveyor screws and forms conveyor troughs. That bottom structure has adjacent to the shell of the furnace an annular opening, through which the solids to be discharged fall out of the furnace. Because the conveyor screws are disposed between the shell of the furnace and the central tube, that known discharge apparatus has the disadvantage that the conveyor screws must be introduced into the furnace when the bottom member has been removed and before the shafts carrying the conveyor screws can be introduced in a radial direction through the bearing bores provided in the shell of the furnace and in the central tube. For this reason the furnace must be entirely emptied and must be disassembled in part when a conveyor it is desired to replace a conveyor screw. Besides, the presence of the annular opening for the discharge of the solids renders a gas-tight sealing of the furnace almost impossible. Finally, a subsequent installation of such discharge apparatus in an existing shaft furnace requires an expensive structural alteration of the furnace.

It is an object of the invention to avoid these disadvantages and so to improve apparatus for the discharge of hot flowable solids, particularly sponge iron, from a shaft furnace that the conveyor screws can be replaced in a simple manner even when the furnace has not been emptied and that existing furnaces can also be provided with the discharge apparatus without need for expensive alterations. Besides, a gas-tight seal of the furnace adjacent to the discharge apparatus with simple means is to be ensured.

This object is accomplished according to the invention in that the centrally disposed, open-bottomed hollow body and the conveyor troughs which contain the conveyor screws are constituted by a bottom structure, which is adapted to be flange-connected to the shell of the furnace, and each conveyor troughs has a largest depth which is at least as large as the outside diameter of the associated conveyor screws and is closed at its outer end by an end wall which is formed with an opening through which the associated conveyor screw extends and said end wall carries a gas-tight discharge housing, which receives the outer end of the associated conveyor screw and is provided with a discharge fitting.

Because the conveyor screws are not rotatably mounted in the shell of the furnace and a stationary central tube but are rotatably mounted in a bottom structure which comprises the conveyor troughs receiving the conveyor screws and also comprises the centrally disposed hollow body, the discharge apparatus according to the invention constitutes a unit which can be flange-connected to the shell of the furnace without a need for a structural alteration of the furnace proper. Because the largest depth of each conveyor trough is at least as large as the largest outside diameter of the associated conveyor screw, said trough can be closed at its outer end by an end wall and the conveyor screw can extend through said end wall into a discharge housing which is gas-tightly joined to the end walls. This discharge housing, which receives the outer end of the associated conveyor screw and can be connected by a discharge fitting to a gas-tight discharge duct, can be gas-tightly sealed without difficulty so that the gas-tight seal of the furnace is ensured. Besides, the discharge housing, which is provided on the end wall of a conveyor trough and receives the outer end of a conveyor screw also permits an introduction and removal of the conveyor screw in the direction of its axis, which is radial with respect to the shell of the furnace. The inwardly tapering conveyor screws can be introduced into and pulled out of the furnace through the opening in the associated end wall of the trough associated trough when the conveyor screw has been released at the inner bearing provided in the centrally disposed hollow body. This can easily be accomplished because the hollow body is open-bottomed so that it is accessible from below. Thereafter the conveyor screw can be pulled out together with the discharge housing or through the latter.

Particularly simple conditions will be obtained when the outer end of each conveyor screw is rotatably mounted in a removable outer wall of the associated discharge housing. In that case only the outer wall of the discharge housing must be removed to provide a free passage for a conveyor screw which is to be introduced or removed.

The introduction and removal of the conveyor screws can be performed in a particularly simple manner if, according to a further development of the invention, each conveyor screw comprises a hollow shaft for receiving a guide rod, which can be inserted through the hollow shaft to determine the direction of the displacement of the conveyor screw so that the latter can easily be centered. When it is desired to replace a conveyor screw when the furnace has not been emptied, the conveyor screw can be caused to screw itself through the contents of the furnace by a rotation of the conveyor screw in the proper sense.

Whereas discharge apparatus having conveyor screws which are arranged to form a star-shaped array and have hollow shafts are already known, the hollow shafts in said known apparatus serve only for conducting a liquid coolant so that these known conveyor screws cannot be used to achieve the results produced according to the invention. Within the scope of the invention, a cooling of the conveyor screws is not desired because heat losses from the contents of the furnace should be avoided.

Obviously the radius of the guide rods must be smaller than the radius of the hollow shafts by an amount which exceeds the wall thickness of the hollow shafts. For this reason the guide rod is supported with a certain play, which must be eliminated in order to ensure an exact guidance of the conveyor screw on the guide rod. This can be accomplished in a particularly simple manner in that the conveyor screws are arranged in pairs which extend diametrically to the central hollow body. In that case the guide rod can be inserted into the hollow shaft of the diametrically opposite conveyor screw without a play so that additional measures are not required.

In order to avoid a retention of material adjacent to the centrally disposed hollow body, which constitutes a part of the bottom structure of the furnace and does not extend through the bottom, the centrally disposed hollow body may constitute at its top a cone-shaped or pyramid-shaped distributor, which tends to urge the contents of the furnace from the central region of the furnace toward the conveyor troughs.

An illustrative embodiment of the invention is shown in the drawings, in which

Figure 2:
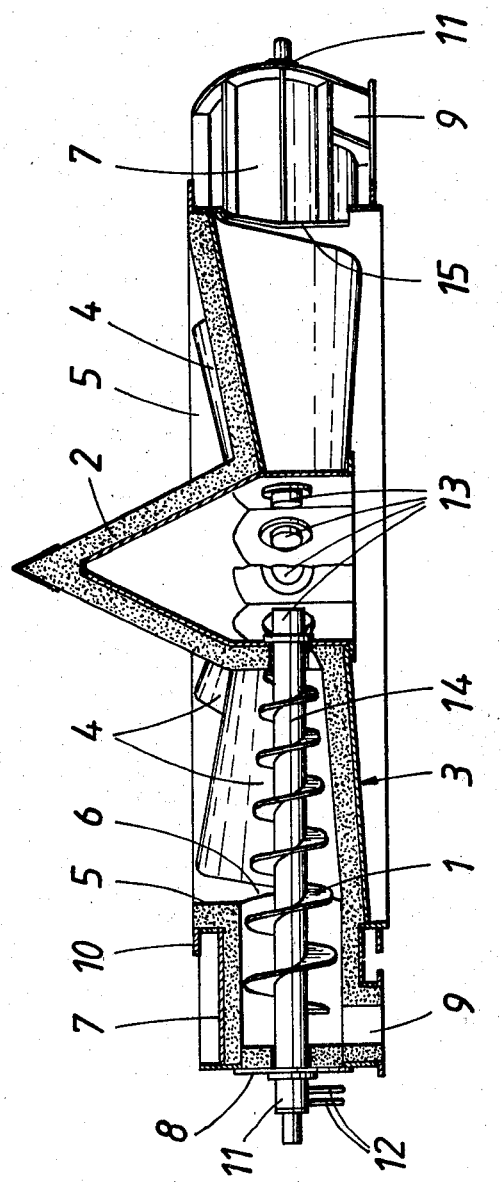
Figure 3:
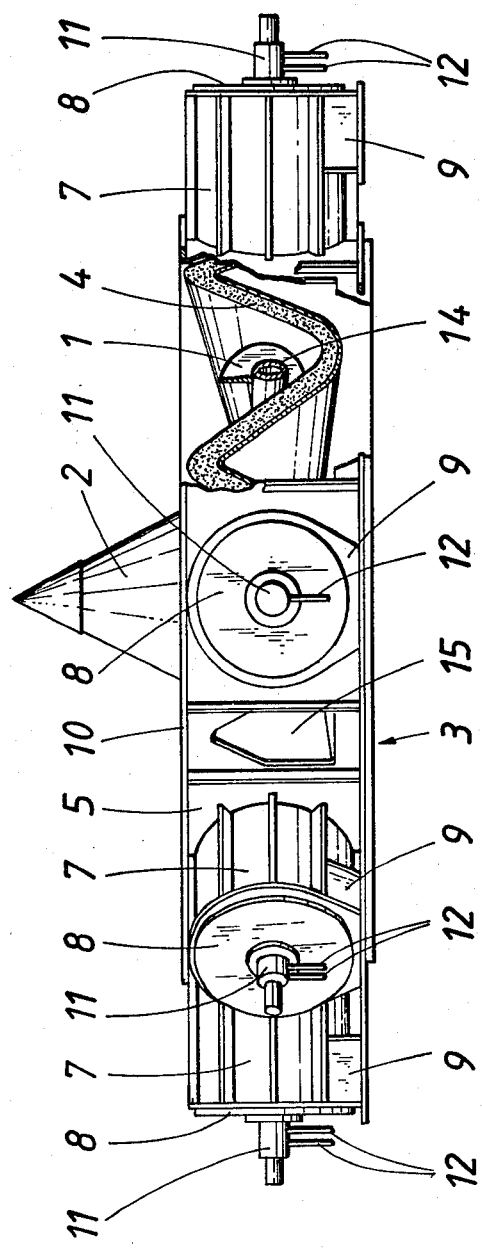

FIG. 1 is a top plan view, partly torn open, showing an apparatus embodying the invention for the discharge of sponge iron from a shaft furnace, FIG. 2 is a sectional view taken on line II—II of FIG. 1 and showing that apparatus and FIG. 3 is a side elevation, partly torn open, showing that apparatus.

As is particularly apparent from FIG. 1, the discharge apparatus shown there comprises conical conveyor screws 1, which are arranged to form a star-shaped array and at their inner ends are rotatably mounted in a centrally disposed, open-bottomed hollow body 2. That hollow body 2 constitutes at its top a cone-shaped distributor for the overlying contents of the furnace and is part of a bottom structure 3, which comprises conveyor troughs 4, each of which receives one of the conveyor screws 1 and has a largest depth which exceeds the largest outside diameter of the associated conveyor screw 1. This is clearly apparent from FIGS. 2 and 3. These conveyor troughs 4 extend from the centrally disposed hollow body 2 and each of them is closed at its outer end by an end wall 5, which has an opening through which the associated conveyor screw 1 extends. That end wall 5 carries a gas-tight discharge housing 7, which receives the outer end of the associated conveyor screw and in which the outer end of the associated conveyor screw 1 is rotatably mounted in an outer wall 8, which is removable from the remainder of the housing 7. The contents of the furnace contact the conveyor screw 1 in the conveyor troughs 4 and are conveyed through the openings 6 into the discharge housings 7 and fall from the latter through discharge fittings 9 into discharge ducts, not shown, which are gas-tightly connected to the discharge fittings 9.

Because the bottom structure 3 which constitutes the centrally disposed hollow body 2 and the conveyor troughs 4 can be connected to the shell of a shaft furnace in a simple manner by means of a mounting flange 10, any shaft furnace can be subsequently provided with the discharge apparatus shown without need for substantial structural alterations. The conveyor troughs 4 constituted by the bottom structure 3 assist the discharge of the contents of the furnace and have a relatively large surface, which ensures a desirable cooling by the ambient air, which has access from underneath. The bottom structure is designed to have a high strength in conjunction with a low overall height. Because the bearings for the conveyor screws 1 are disposed outside the furnace cavity, they are freely accessible even during the operation of the furnace and can be properly cooled. FIGS. 2 and 3 show the conduits 12 for supplying and withdrawing a liquid coolant to and from the outer bearings 11 of the conveyor screws 1. Such cooling system could also be provided for the inner bearings 13.

In accordance with FIG. 3, the conveyor screws 1 have hollow shafts 14. That design permits a particularly simple installation of the conveyor screws because a guide rod can be inserted through such hollow shaft 14 and be used to guide the conveyor screw as it is introduced into or removed from the furnace. A conveyor screw 1 can be axially introduced into the furnace without difficulty when the outer wall 8 has been removed. Because pairs of conveyor screws 1 are diametrically arranged, the guide rod for guiding a screw to be inserted or removed can be inserted into the hollow shaft 14 of the opposite conveyor screw so that the guide rods will be automatically centered with respect to the bearings. For this reason a conveyor screw 1 can easily be replaced even while the furnace is in operation.

As each of the troughs 4 which contain respective conveyor screws 1 is closed at its outer end by an end wall 5, a ventilating passage 15 is left between the conveyor troughs and assists the circulation of air adjacent to the bottom structure.

What is claimed is:

1. In apparatus for discharging hot flowable solids from a shaft furnace, comprising
    a centrally disposed hollow body,
    a plurality of conical conveyor screws arranged to form a star-shaped array and having an inner end each, which is rotatably mounted in said hollow body, and
    a bottom structure comprising a plurality of conveyor troughs, each of which contains one of said conveyor screws,
    the improvement residing in that
    said bottom structure comprises said hollow body and an annular mounting flange,
    each of said conveyor troughs has a largest depth which is at least as large as the largest diameter of the associated conveyor screw,
    each of said conveyor troughs has an outer end wall formed with an opening, through which the associated conveyor screw extends, and
    each of said outer end walls carries a gas-tight discharge housing, which is provided with a discharge fitting and contains the outer end of the associated conveyor screw.

2. The improvement set forth in claim 1, wherein
    each of said discharge housings has an outer wall which is removable from the remainder of said discharge housing and
    the outer end of each of said conveyor screws is rotatably mounted in said outer wall of the associated discharge housing.

3. The improvement set forth in claim 1, wherein each of said conveyor screws has comprises a hollow shaft which is adapted to receive a guide rod.

4. The improvement set forth in claim 3, wherein said conveyor screws are arranged in pairs which extend diametrically with respect to said hollow body.

5. The improvement set forth in claim 1, wherein said hollow body comprises at its top an upwardly tapering distributor.

6. The improvement set forth in claim 5, wherein said distributor has the shape of a cone.

7. The improvement set forth in claim 5, wherein said distributor has the shape of a pyramid.

8. The improvement set forth in claim 1, wherein said mounting flange is adapted to be connected to a shell of a shaft furnace.

9. In a furnace for treating flowable solids, comprising a furnace shell and apparatus for discharging hot flowable solids from the interior of said furnace shell, said apparatus comprising a centrally disposed hollow body contained in the interior of said furnace shell, a plurality of conical conveyor screws arranged to form a star-shaped array and having an inner end each, which is rotatably mounted in said hollow body, and a bottom structure comprising a plurality of conveyor troughs, each of which contains one of said conveyor screws, the improvement residing in that said bottom structure comprises said hollow body and an annular mounting flange, which is connected to said furnace shell, each of said conveyor troughs has a largest depth which is at least as large as the largest diameter of the associated conveyor screw, each of said conveyor troughs has an outer end wall formed with an opening, through which the associated conveyor screw extends, and each of said outer end walls carries a gas-tight discharge housing, which is disposed outside said shell and provided with a discharge fitting and contains the outer end of the associated conveyor screw.

10. The improvement set forth in claim 9 as applied to a shaft furnace for producing sponge iron.

* * * * *